Patented Jan. 18, 1938

2,106,138

UNITED STATES PATENT OFFICE 2,106,138

METHALLYL-SUBSTITUTED BARBITURIC COMPOUND

Horace A. Shonle, Indianapolis, Ind., assignor to Eli Lilly and Company, Indianapolis, Ind., a corporation of Indiana No Drawing. Application November 8, 1937, Serial No. 173,531

12 Claims. (Cl. 260—33)

This present application is a continuation in part of my co-pending applications Serial Nos. 29,519 and 110,133, filed respectively July 2, 1935, and November 10, 1936. The generic claims and certain specific claims are presented in this application, while in the other applications other specific claims are presented.

It is the main object of my invention to produce certain 5,5-di-substituted barbituric acids, and their salts, in which one substituent is the 2-methyl-allyl, otherwise called the methallyl, group, (1) 

and the other substituent is a saturated or unsaturated primary or secondary or cyclic hydrocarbon group which contains from two to six carbon atoms. The second substituent may be defined as a hydrocarbon group which contains from two to six carbon atoms and which has a carbon atom that is directly attached to the methylene carbon of the barbituric compound and that is attached to not more than two other carbon atoms. This second substituent is capable of considerable variation, of which the following are examples:

(a) Ethyl.
(b) n-Propyl, isopropyl.
(c) n-Butyl, isobutyl, secondary-butyl.
(d) n-Amyl, isoamyl, 1-methyl-butyl, 2-methyl-butyl, 1-ethyl-propyl.
(e) n-Hexyl, isohexyl, secondary-hexyl, 2-ethyl-butyl.
(f) Allyl methallyl.
(g) Cyclo-pentyl, cyclo-pentenyl, cyclo-hexyl, cyclo-hexenyl.
(h) Phenyl.

The claims in my aforesaid applications Serial Nos. 29,519 and 110,133 are specifically directed to the compounds where the second substituent is item (d) in the foregoing list.

An incidental object of my invention is to produce certain new intermediates. These are di-substituted malonic esters, and also mono-substituted methallyl malonic ester and barbituric acid.

These new di-substituted barbituric acids of which one substituent is the methallyl group, and their salts, which are included in this present application, all have hypnotic action; the duration of their hypnotic action varies considerably, from some which are very short to some which are quite long. They are all represented by the following formula:

(2) 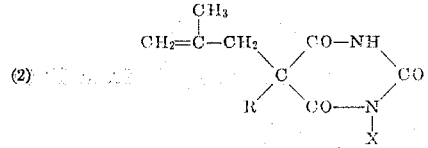

in which R represents a hydrocarbon group which contains from two to six carbon atoms and which has a carbon atom that is directly attached to the methylene carbon of the barbituric compound and that is attached to not more than two other carbon atoms, which group may also be defined as a saturated or unsaturated primary or secondary or cyclic hydrocarbon group having from two to six carbon atoms; and X represents a member of the class consisting of hydrogen (if the compound is an acid), and (if the compound is a salt) an alkali metal, such as sodium, an equivalent of an alkaline-earth metal, such as calcium, ammonium, mono-alkyl ammonium, and di-alkyl ammonium, such as $-NH_3-CH_3$ or $-NH_2(C_2H_5)_2$.

These new salts and acids may be prepared in various ways, of which the following three are illustrative:

A. They may be made from certain new di-substituted malonic esters, usually ethyl esters, which are represented by the following formula:

(3) 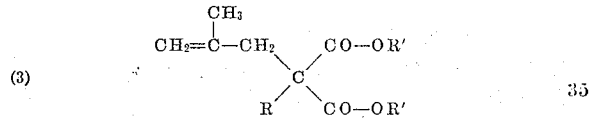

in which R has the same meaning as before, and R' represents an alkyl radical having not to exceed 3 carbon atoms, namely the methyl, ethyl, and propyl radicals, and preferably the ethyl radical. Because of this preference, in making these substituted malonic esters I prefer to work with the ethyl malonates, and so whenever I refer to a malonic ester, substituted or unsubstituted, I mean an ethyl malonate unless otherwise indicated.

B. They may be made by introducing the methallyl group into a mono-R-substituted barbituric acid.

C. When R is the allyl group or the methallyl group, they may be made by introducing that group into the mono-substituted methallyl barbituric acid; which in turn is made by the condensation with urea of the mono-substituted methallyl malonic ester.

In any of these methods, the cyanacetic ester may be used instead of the malonic ester; in which case the resulting imino-barbituric acid is converted by acid hydrolysis into the corresponding barbituric acid.

I will discuss these several methods in order, and give one or more examples under each.

Method A

In discussing Method A, I shall describe first the respective di-substituted malonic esters, then the di-substituted barbituric acids, and then the di-substituted barbiturates, and the procedures for respectively producing them.

Di-substituted malonic esters

In making the respective di-substituted malonic esters, I condense a methallyl halide with the appropriate mono-R-substituted malonic ester, or the appropriate R-halide with methallyl malonic ester, in the presence of sodium ethylate, in the manner customary for making di-substituted malonic esters. For example:

n-Propyl methallyl malonic ester

One mole of sodium is dissolved in from 10 to 12 times its weight of absolute alcohol, under a reflux condenser. One mole of n-propyl malonic ester (n-propyl ethyl-malonate) is then added. Part of the alcohol that was used to dissolve the sodium may then be removed, as by vacuum distillation, and then about 1.1 moles of methallyl chloride is gradually added. The mixture is refluxed for some hours, until it no longer shows an alkaline reaction to moist litmus paper. Most of the alcohol remaining, whether or not some had previously been removed, is now removed by vacuum distillation, leaving an oily residue. Water is added to this residue to dissolve out the sodium chloride present in it; and the oily layer, which is the desired n-propyl methallyl malonic ester, is separated and dried. This n-propyl methallyl malonic ester is purified by fractional distillation in vacuo. When so purified it is a colorless or pale-yellow liquid; which has a boiling point of 103°–107° C., uncorrected, at about 3 mm. pressure. It is represented by the following formula:

(4) 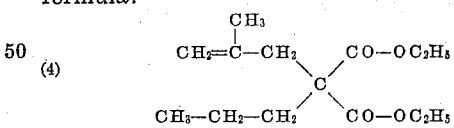

Isoamyl methallyl malonic ester

This may be prepared in the same general manner as described above for n-propyl methallyl malonic ester, save that instead of using n-propyl malonic ester, isoamyl malonic ester is used. The isoamyl methallyl malonic ester obtained is a colorless or pale-yellow liquid; which has a boiling point of 114°–117° C., uncorrected, at 2 to 3 mm. pressure. It is represented by the following formula:

(5) 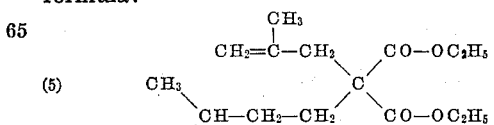

1-methyl-butyl methallyl malonic ester

This may be prepared in the same general manner as described above for n-propyl methallyl malonic ester, save that instead of using n-propyl malonic ester, 1-methyl-butyl malonic ester is used. The 1-methyl-butyl methallyl malonic ester obtained is a colorless or pale-yellow liquid, which has a boiling point of 140°–144° C., corrected, at 8 to 9 mm. pressure. (When "corrected" temperatures are given in this specification, it is meant that the temperatures are those obtained by short-stem Anschütz thermometers, as distinguished from the "uncorrected" temperatures obtained by long-stem thermometers.) It is represented by the following formula:

(6) 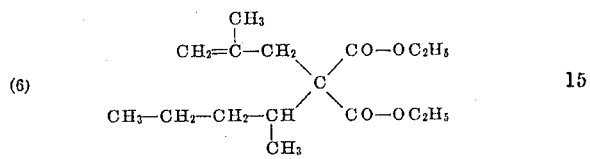

2-methyl-butyl methallyl malonic ester

This may be prepared in the same general manner as described above for n-propyl methallyl malonic ester, save that instead of using n-propyl malonic ester, 2-methyl-butyl malonic ester is used. The 2-methyl-butyl methallyl malonic ester obtained is a colorless or pale-yellow liquid; which has a boiling point of 135°–138° C., uncorrected, at about 7 mm. pressure. It is represented by the following formula:

(7) 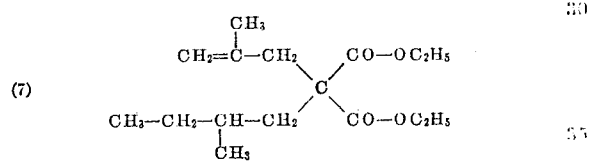

Isopropyl methallyl malonic ester

In preparing this I first prepare methallyl malonic ester.

Methallyl malonic ester is prepared by condensing one mole of methallyl chloride with one mole of sodio-malonic ester, using absolute alcohol in the usual manner for preparing mono-substituted malonic esters. This ester when purified in the usual manner is a colorless or pale-yellow liquid; which has a boiling point of 93°–94° C., uncorrected, at about 3 to 4 mm. pressure. It is represented by the following formula:

(8) 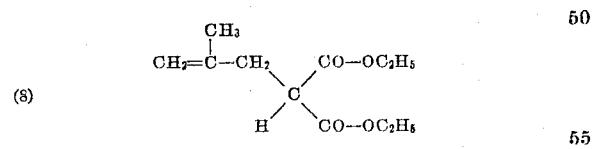

From the methallyl malonic ester thus obtained, I may now prepare isopropyl methallyl malonic ester. This may be prepared in the same general manner as described above for n-propyl methallyl malonic ester, save that instead of using n-propyl malonic ester the methallyl malonic ester is used, and instead of using methallyl chloride isopropyl bromide is used. The isopropyl methallyl malonic ester thus obtained is a colorless or pale yellow liquid; which has a boiling point of 124°–127° C., corrected, at about 9 to 10 mm. pressure. It is represented by the following formula:

(9) 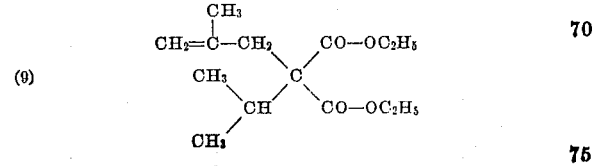

Di-methallyl malonic ester

This may be prepared in the same general manner as described above for isopropyl methallyl malonic ester, save that instead of using isopropyl bromide methallyl chloride is used. The di-methallyl malonic ester obtained is a colorless or pale-yellow liquid; which has a boiling point of 124°–126° C., uncorrected, at about 5 to 6 mm. pressure. It is represented by the following formula:

(10) 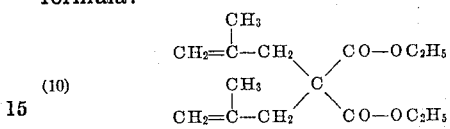

Isobutyl methallyl malonic ester

This may be prepared in the same general manner as described above for isopropyl methallyl malonic ester, save that instead of using isopropyl bromide isobutyl bromide is used. The isobutyl methallyl malonic ester obtained is a colorless or pale-yellow liquid; which has a boiling point of 110°–114° C., uncorrected, at about 1 mm. pressure. It is represented by the following formula:

(11) 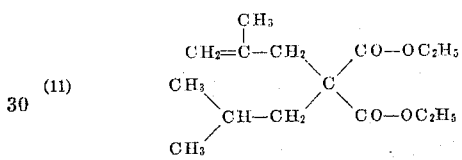

n-Hexyl methallyl malonic ester

This may be prepared in the same general manner as described above for isopropyl methallyl malonic ester, save that instead of using isopropyl bromide, n-hexyl bromide is used. The n-hexyl methallyl malonic ester obtained is a colorless or pale-yellow liquid; which has a boiling point of 122°–130° C., uncorrected, at about 1 mm. pressure. It is represented by the following formula:

(12) 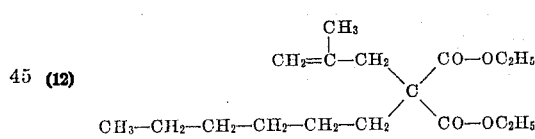

2-ethyl-butyl methallyl malonic ester

This may be prepared in the same general manner as described above for isopropyl methallyl malonic ester, save that instead of using isopropyl bromide, 2-ethyl-butyl bromide is used. The 2-ethyl-butyl methallyl malonic ester obtained is a colorless or pale-yellow liquid; which has a boiling point of 127°–133° C., corrected, at about 1 mm. pressure. It is represented by the following formula:

(13) 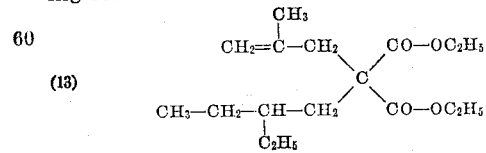

Although I have given different variants of the method for making the above malonic esters either variant may be used for making any of the malonic esters herein contemplated, when R is a halogen-free saturated or unsaturated alkyl hydrocarbon group.

Di-substituted barbituric acids

Di-substituted barbituric acids corresponding to these various di-substituted malonic esters may be obtained. These barbituric acids are represented by the following formula:

(14) 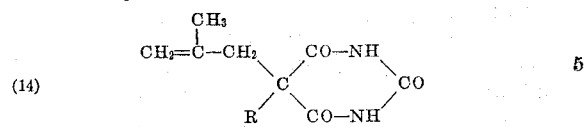

in which R has the same significance as before.

In general, the method of preparing such di-substituted barbituric acids is as follows:

Three moles of sodium are dissolved in 10 to 12 times its weight of absolute alcohol under a reflux condenser. To this are added about 1.6 moles of urea and one mole of the di-substituted malonic ester of which the corresponding barbituric acid is desired. The mixture is gently refluxed for from 12 to 15 hours, after which most of the alcohol is removed by vacuum distillation. The residue is dissolved in water, and a sufficient amount of dilute acid, such as hydrochloric acid, is added to completely throw out of solution the di-substituted barbituric acid which has been formed. This di-substituted barbituric acid comes out of solution in some cases as a solid, and in some cases as an oily liquid which solidifies on standing. The di-substituted barbituric acid so obtained is separated, as by filtration; is then dried, and may be washed with gasoline; and is then purified by recrystallization, from dilute alcohol. The barbituric acids thus obtained are all white solids, generally crystalline; are insoluble in water, and readily soluble in alcohol and ether; are bitter-tasting; and have hypnotic action.

The di-substituted barbituric acids which are obtained from the malonic esters given as examples are the following:

n-Propyl methallyl barbituric acid

This has a melting point, after recrystallization from dilute alcohol, of 173°–175° C., corrected. It is represented by the following formula:

(15) 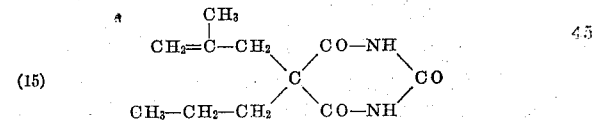

Isoamyl methallyl barbituric acid

This has a melting point, after recrystallization from dilute alcohol, of 143°–145° C., corrected. It is represented by the following formula:

(16) 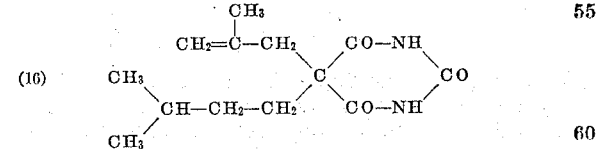

1-methyl-butyl methallyl barbituric acid

This has a melting point, after recrystallization from dilute alcohol, of 141.5°–143.5° C., corrected. It is represented by the following formula:

(17) 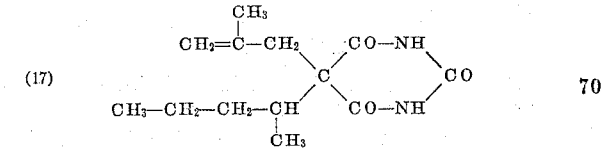

2-methyl-butyl methallyl barbituric acid

This has a melting point, after recrystallization from dilute alcohol, of 142°–144° C., corrected. It is represented by the following formula:

(18) 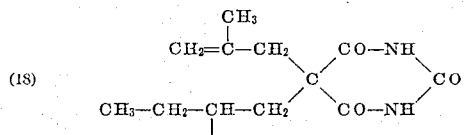

*Isopropyl methallyl barbituric acid*

This has a melting point, after recrystallization from dilute alcohol, of 163°–165° C., corrected. It is represented by the following formula:

(19) 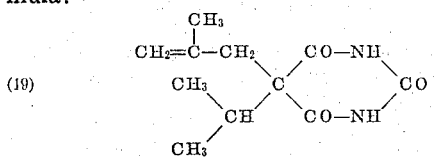

*Di-methallyl barbituric acid*

This has a melting point, after recrystallization from dilute alcohol, of 207°–209° C., corrected. It is represented by the following formula:

(20) 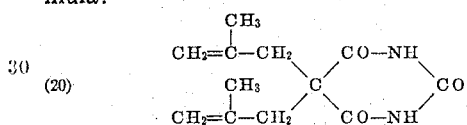

*Isobutyl methallyl barbituric acid*

This has a melting point, after recrystallization from dilute alcohol, of 179°–181° C., corrected. It is represented by the following formula:

(21) 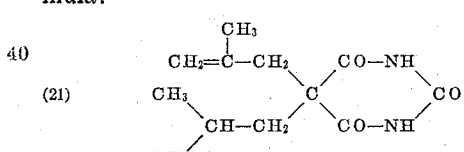

*n-Hexyl methallyl barbituric acid*

This has a melting point, after recrystallization from dilute alcohol, of 127°–129° C., corrected. It is represented by the following formula:

(22) 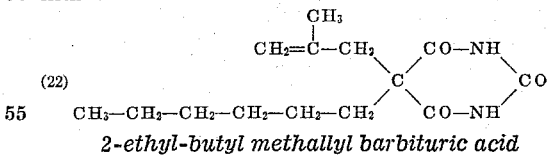

*2-ethyl-butyl methallyl barbituric acid*

This has a melting point, after recrystallization from dilute alcohol, of 148°–150° C., corrected. It is represented by the following formula:

(23) 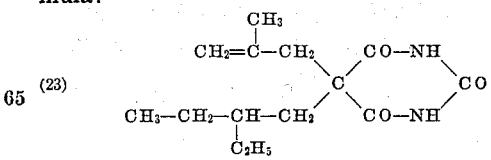

Method B

In Method B the methallyl group is introduced into a mono-R-substituted barbituric acid, where R is a hydrocarbon group of the same character as before.

The general method of doing this is as follows: One mole of the mono-R-substituted barbituric acid, (which in most instances contemplated in this application is a known mono-R-substituted barbituric acid, and in any case can be prepared in a manner analogous to that used in preparing known substituted barbituric acids) is dissolved in a 10% to 35% aqueous solution of one mole of potassium hydroxide or sodium hydroxide. To this are added somewhat in excess of one mole of a methallyl halide, such as methallyl chloride, and alcohol in suitable amount, preferably sufficient to make a homogeneous solution. The reaction may be caused to go to completion either by agitating the mixture for 50 to 75 hours at room temperature, or slightly above, or by refluxing it for a briefer period. Then the solution, which may still exhibit two layers if the alcohol concentration is low, is freed from alcohol and from any unreacted methallyl chloride, as by vacuum distillation. On cooling, the di-substituted barbituric acid separates either as a solid or as an oily layer which solidifies on standing. This is dried, washed with petroleum ether, and dissolved in the minimum amount of benzene. The benzene solution is preferably washed with a dilute solution of sodium bicarbonate to remove any unreacted mono-substituted barbituric acid. The new di-substituted barbituric acid is extracted from the benzene solution with a dilute sodium hydroxide solution. Acidification of the extract with dilute acid, conveniently hydrochloric acid, causes the barbituric acid to precipitate in a solid or semi-solid form which crystallizes on standing. The crude barbituric acid is separated from the water, and purified by recrystallization from dilute alcohol.

Among the examples of di-substituted barbituric acids which may be prepared in this way are all those listed under Method A; and in addition the following, of which those where R is an alkyl group may also be made by Method A:

Ethyl methallyl barbituric acid is a white crystalline solid which after recrystallization from dilute alcohol has a melting point of 165°–167° C., corrected; and is represented by the following formula:

(24) 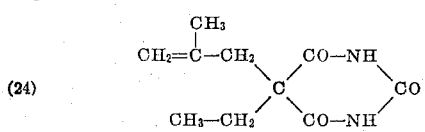

n-Butyl methallyl barbituric acid is a white crystalline solid which after recrystallization from dilute alcohol has a melting point of 125°–127° C., corrected; and is represented by the following formula:

(25) 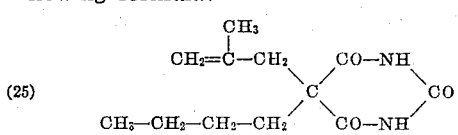

Secondary-butyl methallyl barbituric acid is a white crystalline solid which after recrystallization from dilute alcohol has a melting point of 139°–142° C., corrected; and is represented by the following formula:

(26) 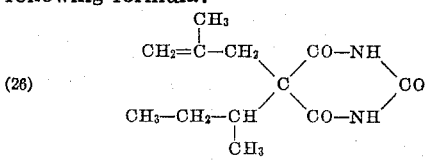

n-Amyl methallyl barbituric acid is a white crystalline solid which after one or two recrystallizations from dilute alcohol has a melting point of 94°–96° C., corrected, and after repeated recrystallizations has a melting point of 110°–112° C., corrected; and is represented by the following formula:

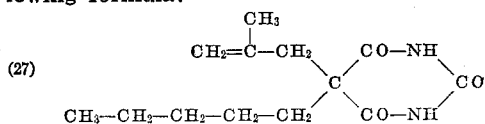
(27)

Allyl methallyl barbituric acid is a white crystalline solid which after one or two recrystallizations from dilute alcohol has a melting point of 149°–151° C., corrected, and after repeated recrystallizations has a melting point of 165°–167° C., corrected. It is made with better yields by Method A than by Method B. It is represented by the following formula:

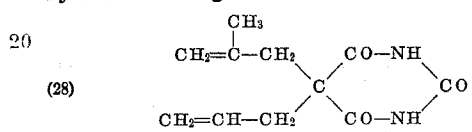
(28)

Phenyl methallyl barbituric acid (which can not be made by Method A) is a white crystalline solution which after recrystallization from dilute alcohol has a melting point of 203°–205° C., corrected; and is represented by the following formula:

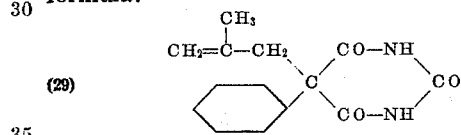
(29)

1-ethyl-propyl methallyl barbituric acid is a white crystalline solid which after recrystallization from dilute alcohol has a melting point of 183°–184° C., corrected; and is represented by the following formula:

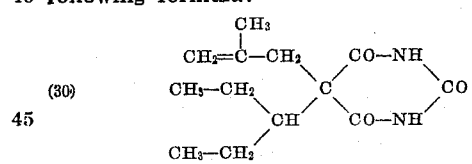
(30)

Cyclo-pentyl methallyl barbituric acid is a white crystalline solid which after recrystallization from dilute alcohol has a melting point of 157°–159° C., corrected; and is represented by the following formula:

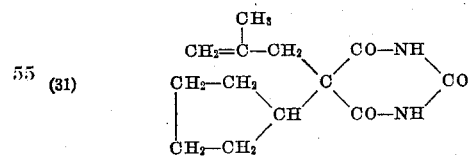
(31)

Method C

In Method C, as in Method B, a mono-substituted barbituric acid has introduced into it the necessary group to make the desired di-substituted barbituric acid; but in Method C the mono-substituted barbituric acid has a methallyl group as the substituent, and the other desired group is subsequently introduced, as distinguished from Method B where the methallyl group is the second substituent introduced. Methods B and C are the same, of course, when the desired acid is di-methallyl barbituric acid; indeed, that acid is one of the di-substituted barbituric acids contemplated by this present invention that can be made by any one of Methods A, B, and C.

In Method C, it is first necessary to obtain the mono-substituted methallyl barbituric acid. This may be done as follows: Three moles of sodium are dissolved in ten to twelve times its weight of absolute alcohol, under a reflux condenser. To this are added about 1.6 moles of urea and one mole of methallyl malonic ester—which latter may be prepared as has already been explained in connection with isopropyl methallyl malonic ester. The mixture is gently refluxed for from four to six hours. During the refluxing, the sodium methallyl barbiturate as it is formed separates as a whitish solid. At the end of the refluxing period the contents of the flask are cooled and the sodium methallyl barbiturate is separated from the alcohol by filtration. This crude sodium methallyl barbiturate is dissolved in a small amount of water. To this is added a dilute acid, such as hydrochloric acid, which causes a precipitation of methallyl barbituric acid. The methallyl barbituric acid so obtained is separated, as by filtration; and is then recrystallized from dilute alcohol. The methallyl barbituric acid thus obtained is a white crystalline solid, slightly soluble in water, and soluble in alcohol. It has a melting point of 187°–189° C., corrected. It is represented by the following formula:

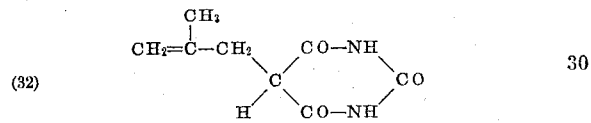
(32)

Using this methallyl barbituric acid, it is now possible to get various di-substituted barbituric acids. One general method of doing this is substantially the general method which is given under Method B, save that the mono-substituted barbituric acid is methallyl barbituric acid and the halide used is a halide of the desired second substituent of the di-substituted barbituric acid. This is applicable when R is the allyl group or the methallyl group.

Barbiturates

All of the above-described barbituric acids are soluble in solutions of alkali-metal hydroxides and ethylates, to form the corresponding alkali-metal barbiturates in solution. The solid salts may be obtained from such solutions.

The new di-substituted barbiturates, which may all be represented by Formula 2 with X representing a metal or ammonium or a mono- or di-substituted ammonium, may perhaps best be prepared from the corresponding di-substituted barbituric acids, as by reaction in a suitable solvent with either the hydroxide or the ethylate of the desired inorganic base, or with ammonia, or with the desired alkyl amine. For instance:

*Alkali metal salts.*—The sodium salts of these di-substituted barbituric acids are all represented by the following general formula:

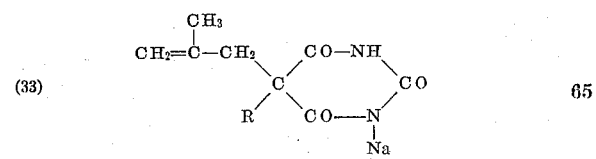
(33)

in which R has the same significance as before. The other alkali-metal salts have the same general formula, except for the substitution of the other metal for sodium. These salts are prepared as follows: A solution of one molar proportion of the hydroxide or ethylate of the alkali metal, such as sodium, is added to a suspension or solution in a suitable solvent, such as alcohol, of one molar proportion of any of the herein-contemplated di-substituted barbituric acids; which produces the desired barbiturate in solution. The amount of solvent used is desirably sufficient to dissolve the salt thus produced. The solution is filtered; and is then evaporated, preferably under vacuum at a low temperature, until the salt is obtained in solid form. The sodium salts of the various di-substituted barbituric acids given as examples are the following:

Sodium n-propyl methallyl barbiturate.
Sodium isoamyl methallyl barbiturate.
Sodium 1-methyl-butyl methallyl barbiturate.
Sodium 2-methyl-butyl methallyl barbiturate.
Sodium isopropyl methallyl barbiturate.
Sodium di-methallyl barbiturate.
Sodium isobutyl methallyl barbiturate.
Sodium n-hexyl methallyl barbiturate.
Sodium 2-ethyl-butyl methallyl barbiturate.
Sodium ethyl methallyl barbiturate.
Sodium n-butyl methallyl barbiturate.
Sodium secondary-butyl methallyl barbiturate.
Sodium n-amyl methallyl barbiturate.
Sodium allyl methallyl barbiturate.
Sodium phenyl methallyl barbiturate.
Sodium 1-ethyl-propyl methallyl barbiturate.
Sodium cyclo-pentyl methallyl barbiturate.

The formulas of these barbiturates are the same as those of the corresponding barbituric acids save for the substitution of sodium for hydrogen at the point corresponding to X in Formula 2.

These sodium salts are all white solids, soluble in water and alcohol, and insoluble in ether. They are all bitter-tasting, and their aqueous solutions are alkaline in reaction. They are all excellent hypnotics, when administered either orally or hypodermically. Some of them are of particular advantage when hypnosis of relatively short duration is desired.

When these salts are desired in stable form sufficiently free from contaminants so that clear water solutions thereof suitable for intravenous injection may be obtained, they may be so obtained by the method set forth in my Patent No. 1,856,792, granted May 3, 1932.

*Ammonium and alkyl-amine salts.*—One molar proportion of any of the above-described 5,5-di-aliphatic-substituted barbituric acids is dissolved in or added to somewhat more than a molar proportion of an aqueous or alcoholic solution of concentrated ammonia or of an alkyl-amine, such for instance as mono- or di-methyl amine or mono- or di-ethyl amine. The amount of liquid used should be sufficient to ensure complete reaction. The resulting barbiturate crystallizes out or is concentrated to solid form. The formulas of these barbiturates correspond in general to the formulas of the acids, save that NH4 is substituted for H at the point X of Formula 2 in the case of the ammonium salts, or the proper substituted-ammonium radical, such for instance as the methyl-ammonium radical (—NH3CH3), is substituted for that H in the case of the alkyl-amine salts.

I claim as my invention:

1. A barbituric compound which is represented by the following formula:

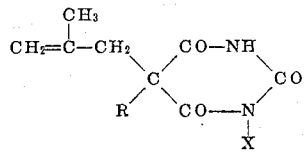

in which R represents a hydrocarbon group which contains from two to six carbon atoms and which has a carbon atom that is directly attached to the methylene carbon of the barbituric compound and that is attached to not more than two other carbon atoms; and X represents a member of the class consisting of hydrogen, an alkali metal, an equivalent of an alkaline-earth metal, ammonium, mono-alkyl ammonium, and di-alkyl ammonium.

2. A barbituric acid which is represented by the following formula:

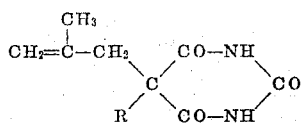

in which R represents a hydrocarbon group which contains from two to six carbon atoms and which has a carbon atom that is directly attached to the methylene carbon of the barbituric compound and that is attached to not more than two other carbon atoms.

3. A barbituric compound which is represented by the following formula:

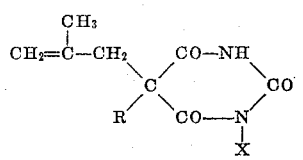

in which R represents a hydrocarbon group which contains at least four and not over five carbon atoms and is in the class consisting of the n-butyl, isobutyl, secondary-butyl, n-amyl, iso-amyl, 1-methyl-butyl, 2-methyl-butyl, 1-ethyl-propyl, and cyclopentyl groups; and X represents a member of the class consisting of hydrogen, an alkali metal, an equivalent of an alkaline-earth metal, ammonium, mono-alkyl ammonium, and di-alkyl ammonium.

4. A barbituric acid which is represented by the following formula:

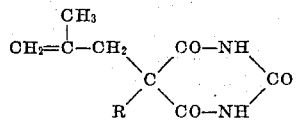

in which R represents a hydrocarbon group which contains at least four and not over five carbon atoms and is in the class consisting of the n-butyl, iso-butyl, secondary-butyl, n-amyl, iso-amyl, 1-methyl-butyl, 2-methyl-butyl, 1-ethyl-propyl, and cyclopentyl groups.

5. A barbituric acid derivative having the general formula:

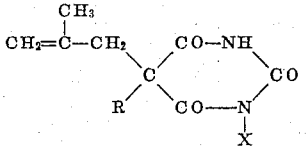

wherein R represents a member of the group consisting of alkyl and alkylene radicals; and X represents a member of the class consisting of hydrogen, an alkali metal, an equivalent of an alkaline-earth metal, ammonium, mono-alkyl ammonium, and di-alkyl ammonium.

6. A di-(2-methyl-allyl) barbituric compound having the formula:

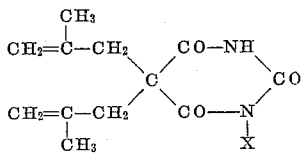

in which X represents a member of the class consisting of hydrogen, an alkali metal, an equivalent of an alkaline-earth metal, ammonium, mono-alkyl ammonium, and di-alkyl ammonium.

7. An ethyl-(2-methyl-allyl) barbituric compound having the formula:

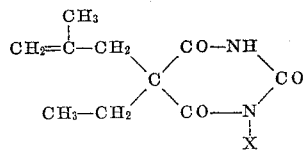

in which X represents a member of the class consisting of hydrogen, an alkali metal, an equivalent of an alkaline-earth metal, ammonium, mono-alkyl ammonium, and di-alkyl ammonium.

8. A butyl-(2-methyl-allyl) barbituric compound having the formula:

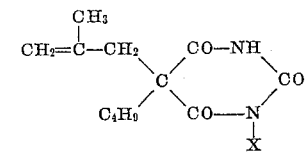

in which X represents a member of the class consisting of hydrogen, an alkali metal, an equivalent of an alkaline-earth metal, ammonium, mono-alkyl ammonium, and di-alkyl ammonium.

9. A barbituric acid derivative having the general formula:

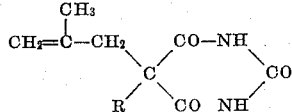

wherein R represents a member of the group consisting of alkyl and alkylene radicals.

10. Di-methallyl barbituric acid, a crystalline compound melting at a temperature of approximately 207°–209° C. and having the formula:

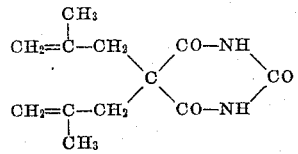

11. Ethyl-(2-methyl-allyl) barbituric acid, a crystalline compound melting at a temperature of approximately 165°–167° C. and having the formula:

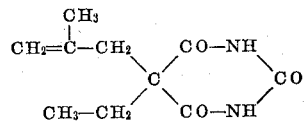

12. Butyl-(2-methyl-allyl) barbituric acid, a crystalline compound melting at a temperature of approximately 125°–127° C. and having the formula:

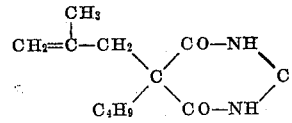

HORACE A. SHONLE.

CERTIFICATE OF CORRECTION.

Patent No. 2,106,138.　　　　　　　　　　　　　　　January 18, 1938.

HORACE A. SHONLE.

It is hereby certified that error appears in the printed specification of the above numbered patent requiring correction as follows: Page 1, first column, line 35, after the word "Allyl" insert a comma; page 7, second column, line 7, claim 9, in the formula, for "CO   NH" read CO—NH; and that the said Letters Patent should be read with these corrections therein that the same may conform to the record of the case in the Patent Office.

Signed and sealed this 1st day of March, A. D. 1938.

(Seal)

Henry Van Arsdale,
Acting Commissioner of Patents.